Patented Apr. 1, 1924.

1,488,844

UNITED STATES PATENT OFFICE.

WALTHER STRAUB, OF FREIBURG IN THE BRISGAU, GERMANY, ASSIGNOR TO FARBEN-FABRIKEN VORM. FRIEDR. BAYER AND CO., OF LEVERKUSEN, NEAR COLOGNE-ON-THE-RHINE, GERMANY.

SOPORIFIC.

No Drawing.  Application filed January 25, 1923. Serial No. 615,453.

*To all whom it may concern:*

Be it known that I, WALTHER STRAUB, a citizen of Germany, residing at Freiburg in the Brisgau, in the State of Baden, Germany, have invented new and useful Improvements in Soporifics, of which the following is a specification.

I have found that the alkali metal salts of dialkylbarbituric acids which are valuable soporifics can be deprived of their bitter taste by treatment with disodium phosphate. The mixtures thus obtained are whitish tasteless products soluble in water and are valuable soporifics, an average single dose being about 0.5 grams.

In order to illustrate the invention more fully the following examples are given:—

1. Equal quantities of the sodium salt of diethylbarbituric acid and disodium phosphate (free from water) are dissolved together in water. The resulting solution is tasteless and can be used directly.

2. Equal quantities of the sodium salt of diethylbarbituric acid and disodium phosphate (free from water) are intimately mixed together and the resulting mixture is formed into tablets with or without the addition of starch or any other suitable material.

I claim:

1. The herein described new compounds of the alkali metal salts of dialkylbarbituric acids and disodium phosphate, being tasteless whitish products which are valuable soporifics, substantially as described.

2. The herein described new compounds of the alkali metal salts of diethylbarbituric acid and disodium phosphate, being tasteless whitish products which are valuable soporifics, substantially as described.

3. The herein described new compound of the sodium salt of diethylbarbituric acid and disodium phosphate, being a tasteless whitish product which is a valuable soporific, substantially as described.

In testimony whereof I have hereunto set my hand.

WALTHER STRAUB.

Witnesses:
 ALEXANDER DE SOTO,
 EMMA SCHMITT.